United States Patent [19]

Huston et al.

[11] Patent Number: 5,079,459
[45] Date of Patent: Jan. 7, 1992

[54] ELECTRO-HAMMER RAPPER

[75] Inventors: J. Timothy Huston, Lancaster, Ohio; Alex J. Kurasz, Macungie, Pa.; John C. Matthews, Lancaster, Ohio

[73] Assignee: The Babcock & Wilcox Company, New Orleans, La.

[21] Appl. No.: 644,992

[22] Filed: Jan. 23, 1991

[51] Int. Cl.[5] ............................................... H02K 33/00
[52] U.S. Cl. ..................................... 310/15; 310/12; 361/166; 165/84
[58] Field of Search .................. 310/12, 13, 15, 14; 361/166, 167; 318/687, 686, 135, 114, 112, 85; 165/84

[56] References Cited

U.S. PATENT DOCUMENTS

| | | | |
|---|---|---|---|
| 3,835,817 | 9/1974 | Tuomaala | 122/379 |
| 3,997,000 | 12/1976 | Piela | 165/84 |
| 4,018,267 | 4/1977 | Tomasicchio | 165/84 |
| 4,086,646 | 4/1978 | Lanese | 361/166 |
| 4,120,672 | 10/1978 | Lanese | 165/84 |
| 4,305,736 | 12/1981 | Kahl et al. | 122/379 |
| 4,409,007 | 10/1983 | Torrey et al. | 55/112 |
| 4,457,361 | 7/1984 | Premel et al. | 165/84 |
| 4,497,282 | 2/1985 | Neundorfer | 122/379 |
| 4,532,431 | 7/1985 | Iliev et al. | 310/15 |
| 4,594,521 | 7/1986 | Schlicher | 310/15 |
| 4,595,048 | 6/1986 | Pollak et al. | 165/84 |
| 4,675,563 | 6/1987 | Goldowsky | 310/15 |
| 4,741,292 | 5/1988 | Novak | 122/379 |

Primary Examiner—Peter S. Wong
Assistant Examiner—Matthew Nguyen
Attorney, Agent, or Firm—Harness, Dickey & Pierce

[57] ABSTRACT

An electromagnetic hammer rapper having forward and retract coils for controllably causing a centrally disposed armature to impact an impact transfer pin to cause the transfer pin to knock-off slag and other encrustations from heat transfer tubes or walls of heat exchanger components, and for causing the armature to be propelled to a retracted position. An electrical circuit for controlling energization of the forward and retract coils is also provided and includes a manually actuatable switch for initiating an impact between the armature and the transfer pin. An auto sequencer/manual selector circuit controls the forward and retract coils of a plurality of electromagnetic solenoids. A phase detection and triggering circuit having an operator adjustable phase control controls the duration for which the forward coil of each electromagnetic solenoid is energized. An independent logic circuit associated with each electromagnetic solenoid is also included for further helping to control the energization of the forward and retract coils. An SCR and a triac each associated with a specific logic circuit and responsive to the logic circuit are included for controlling energization of the forward and retract coils of each electromagnetic solenoid.

16 Claims, 4 Drawing Sheets

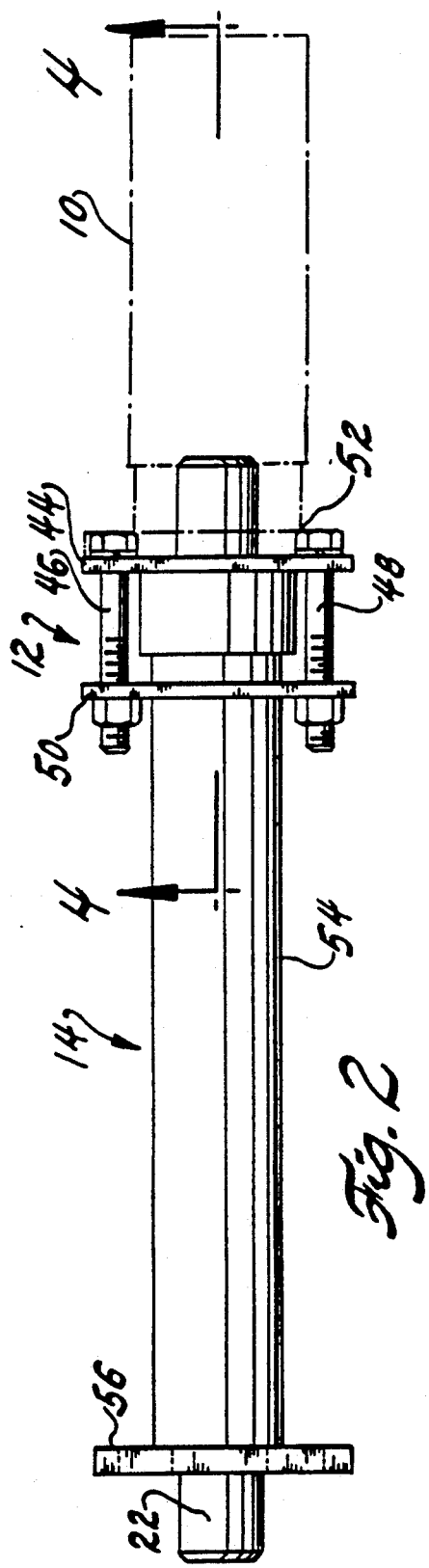
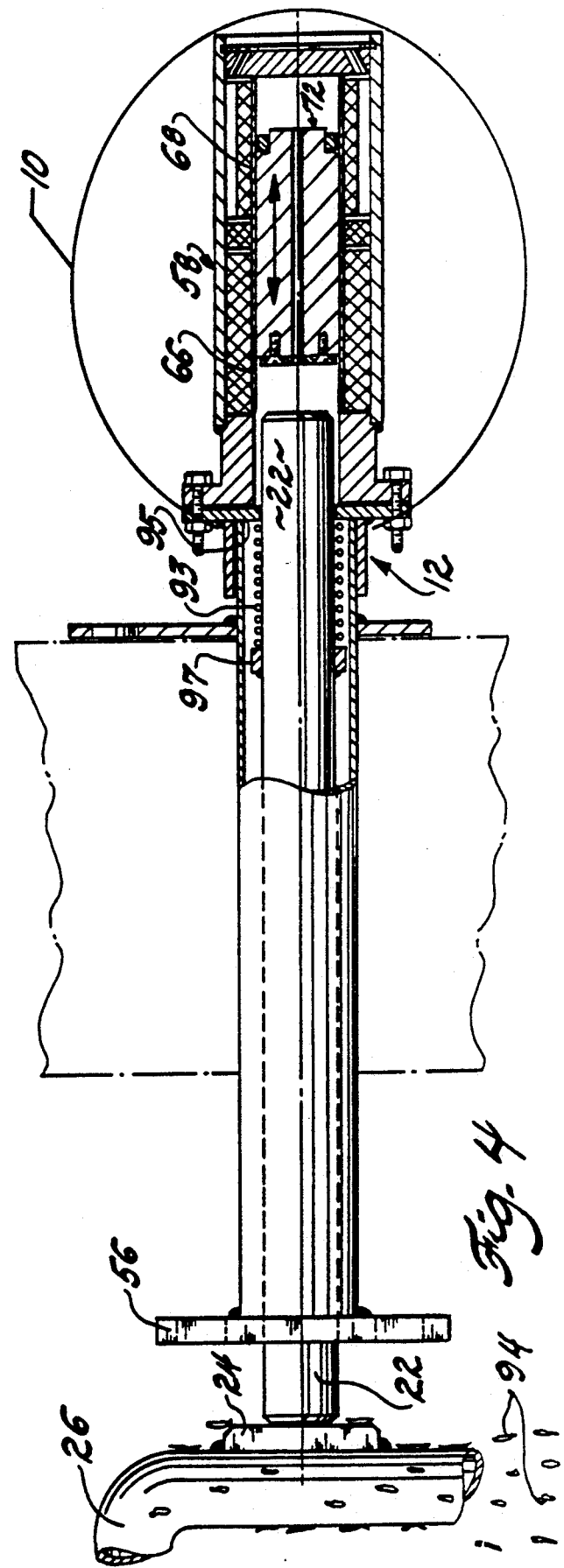

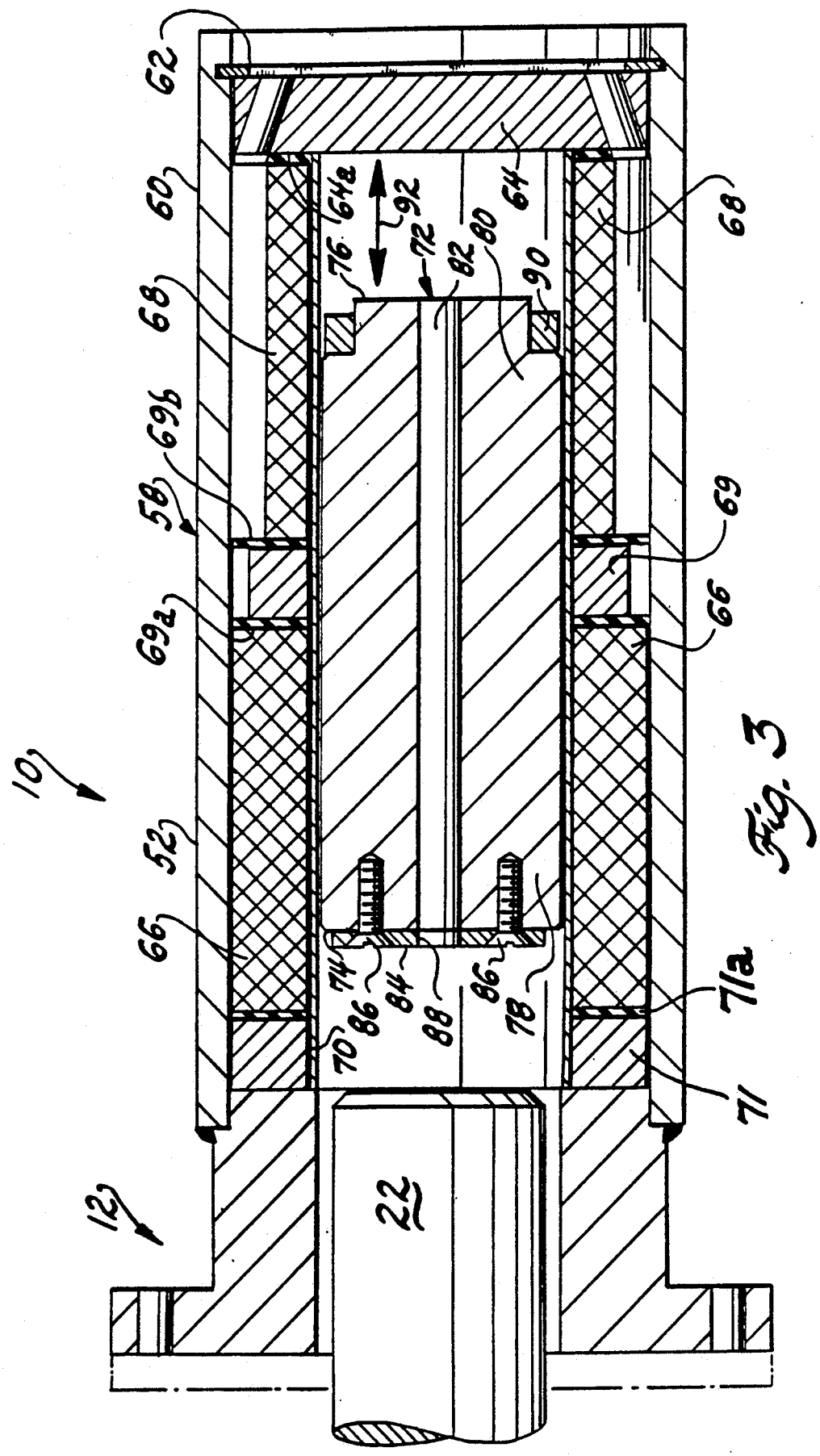

ELECTRO-HAMMER RAPPER

BACKGROUND OF THE INVENTION

1. Technical Field

This invention relates to electromagnetic solenoid assemblies and particularly to an electromagnetic solenoid having independently controllable forward and retract coils for use in actuating a rapper for removing slag from heat transfer tubes or walls of heat exchanger components.

2. Description

Trash burners and large scale boilers used by public utilities and industry are often fired by ash-producing fossil fuels. The internal surfaces of the heat exchanger often become fouled with ash encrustation during use. Such fouling adversely effects the heat transfer efficiency of the heat exchanger. Accordingly, it is necessary to provide a system for cleaning the heat exchanger surface.

One type of system presently in widespread use for de-slagging heat exchanger surfaces employs so-called sootblowers. These devices have a lance tube with a nozzle at its outer end which projects a fluid medium such as water, steam or air against the fouled surfaces. The thermal shock and mechanical impact caused by the blowing medium break away the slag encrustations from the heat exchanger surfaces.

Although sootblowers generally operate satisfactorily and are superior devices in many applications, they have certain limitations. Sootblowers consume a substantial amount of blowing medium which is a direct expense to the operator of the heat exchange facility. Additionally, sootblowers are unable to reach the areas of the heat exchanger which are inaccessible or beyond the effective range of the discharged blowing medium. Perhaps most significantly, however, is that sootblowers clean surfaces to bare metal, thus leaving them susceptible to high corrosion in highly corrosive and acidic environments.

Another system for removing encrustations from heat exchanger surfaces is through the use of mechanical rappers. Such rappers typically have an impacter which through some mechanical linkage strikes a surface within the heat exchanger in order to produce a mechanical vibration which causes the ash encrustation to disintegrate or loosen its adhesion to the heat exchanger surface. A principal advantage of mechanical rappers with respect to sootblowers is that mechanical rappers do not remove the protective oxide layer on the surfaces of the tubes, thereby enabling the oxide layer to help protect the surfaces of the tubes from corrosive environments. Mechanical rappers can be manually, pneumatically or electrically actuated.

One approach for providing an electrically actuated rapper is to employ a solenoid which is propelled forward against an impact target. Such a rapper could be designed to include a spring for retracting the impacter after the impacter has been mechanically or otherwise caused to impact or actuate its associated mechanical linkage during a rap sequence period. Such springs, however, provide drawbacks in that they typically wear out relatively quickly and also cause additional vibration in the mechanical impacter itself.

Another drawback in conventional mechanical rappers has been the inability to accurately control the force with which the impacter impacts the heat exchanger or mechanical linkage in contact with the heat exchanger. In certain applications, it would be desirable to have a mechanical rapper whose impacter element is controllable, to thereby provide control over the force with which the impacter element impacts its heat exchanger tubing or associated mechanical linkage.

It is therefore a principal object of the present invention to provide an electromagnetic hammer rapper which is operable to be propelled into impact or retracted positions without the aid of springs or other mechanical biasing means.

It is a further object of the present invention to provide an electromagnetic hammer rapper operable to retract its impact element in a relatively smooth, vibration-free fashion.

It is still a further object of the present invention to provide an electromagnetic hammer rapper having an impact element whose impact force may be controlled by an operator.

SUMMARY OF THE INVENTION

The above and other objects are provided by a dual coil, electromagnetic hammer rapper in accordance with the present invention. The hammer rapper generally comprises an outer housing having first and second portions, electrically energizable forward and retract coils disposed within the first and second portions of the housing, a stop mounted adjacent one end of the housing, and a slidably disposed, elongated armature acting as a piston, disposed within the forward and retract coils.

When the armature is in a retracted position, the application of electrical current to the forward coil causes the coil to generate an electromagnetic force, which causes the armature to be propelled outwardly into contact with an impact transfer pin which is in contact with a pipe or other like portion of a heat exchanger. The impact of the armature against the impact transfer pin causes the transfer pin to transmit the kinetic energy imparted to it by the armature to the pipe, whereby the kinetic energy causes the pipe to vibrate, thereby de-slagging the pipe. When the retract coil is energized the armature is caused to be propelled in a rearward direction into contact with the stop. Thus, retraction of the armature, or impact element, is effected without the need for springs or other mechanical biasing means. This feature of the present invention enables a more continually uniform retracting action due to the absence of a retraction spring or other like mechanical biasing means.

In a preferred embodiment of the present invention the armature also includes a shaded pole which helps to reduce the velocity at which the armature is retracted, and also to substantially reduce any hum or buzz which may be generated by the retract coil.

The preferred embodiment of the present invention further comprises a control circuit for controlling energization of the impact and retract coils. In addition, the control circuit provides a phase detection circuit having a manually adjustable phase selection device for enabling an operator of the hammer rapper to controllably adjust the duration during which the impact coil will be energized, thereby controlling the force with which the armature will be propelled into contact with the impact transfer pin.

BRIEF DESCRIPTION OF THE DRAWINGS

The various advantages of the present invention will become apparent to one skilled in the art by reading the following specification and subjoined claims and by referencing the following drawings in which:

FIG. 2 is a side view of a mounting flange used to secure the hammer rapper in alignment with an impact transfer pin;

FIG. 3 is an enlarged cross-sectional view of the hammer taken along section lines 4—4 of FIG. 2, wherein the hammer rapper is represented by phantom lines in accordance with reference numeral 10 of the present invention;

FIG. 4 is a partial sectional view taken along section lines 4—4 of FIG. 2 showing in cross-section the hammer rapper of the present invention and a portion of the impact transfer pin and its associated housing, as well as a section of tubing of a heat exchanger having its slag being knocked off by the impact transfer pin.

DETAILED DESCRIPTION OF THE PREFERRED EMBODIMENTS

Figure 1:
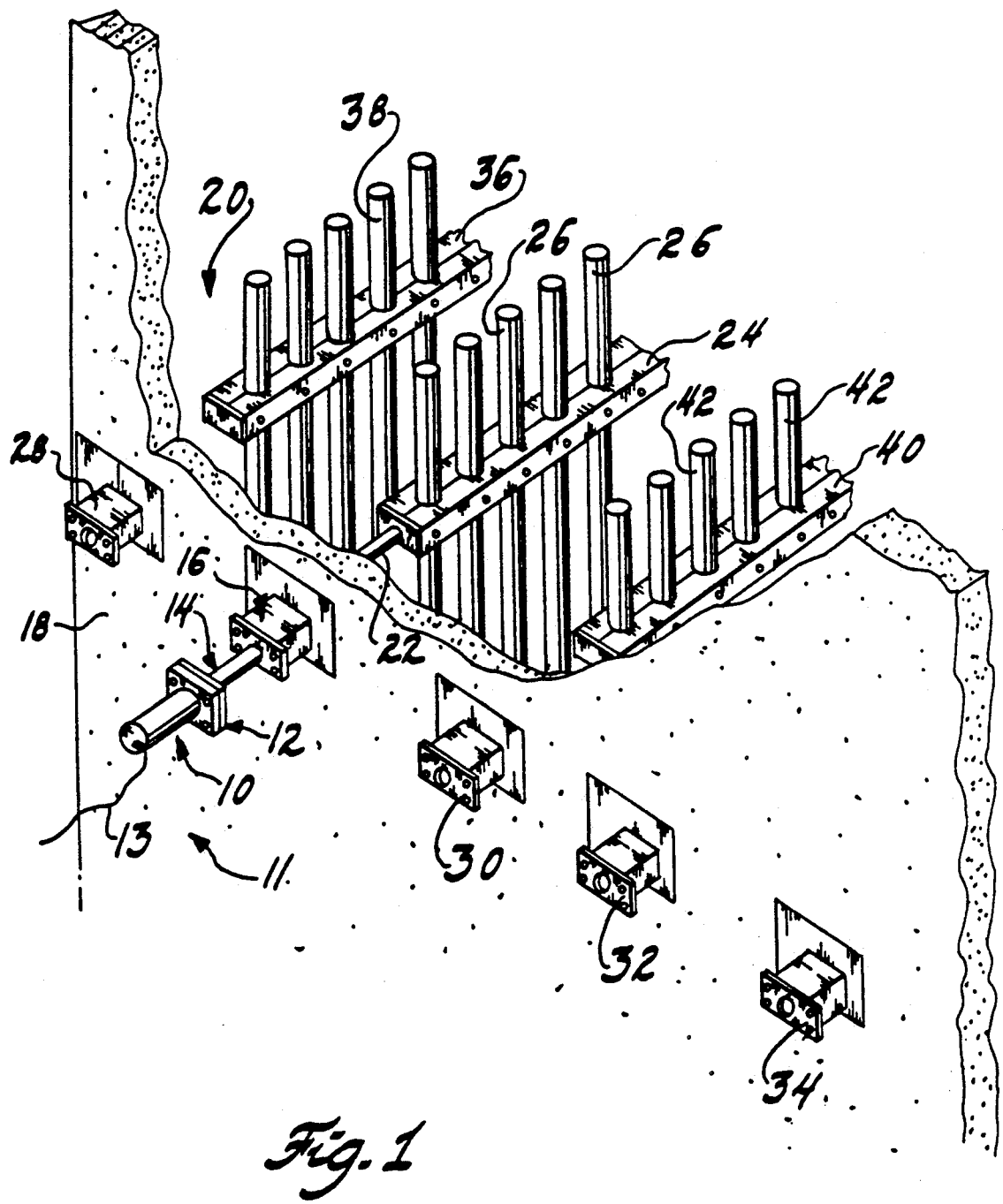
FIG. 1 is an overall perspective view of an electromagnetic hammer rapper in accordance with the present invention showing how the hammer rapper may be coupled to a conventional heat exchanger system to de-slag the system.

Referring first to FIG. 1, an electromagnetic hammer rapper 10 in accordance with a hammer rapper system 11 of the present invention is shown coupled to a mounting flange assembly 12. A multiple conductor cable 13 for communicating electrical signals to the hammer rapper is also shown. The mounting flange assembly 12 is in turn connected to a impact transfer pin assembly 14 which is in turn connected to a guide member 16 mounted to a portion of an outer housing wall 18 of a heat exchanger assembly 20. An elongated impact transfer pin 22 is concentrically disposed within the impact transfer pin assembly 14 and extends through the guide member 16 and outer housing wall 18 of the heat exchanger and into abutting contact with a spacing block 24. The spacing block 24 is used to maintain a plurality of heating tubes 26 in an evenly spaced arrangement, and also to transfer kinetic energy transmitted via the impact transfer pin 22 to the heating tubes 26. A detailed discussion of this process will be given in connection with FIGS. 3 and 4.

While FIG. illustrates only a single electromagnetic hammer rapper 10 for de-slagging a particular group of tubing sections 26, it should be appreciated that several hammer rappers 10 will preferably be employed in a typical de-slagging system and will be coupled via individual impact pin transfer assemblies to guide members 28-34. Guide member 28, then, will operate to guide the impact transfer pin of its associated impact transfer assembly into abutting contact with its associated spacing block 36. Guide member 30, likewise, will operate to guide the impact transfer pin of its associated impact transfer pin assembly into abutting contact with its associated spacing block 40 and associated plurality of heating tubes 42. Accordingly, a typical de-slagging system may incorporate an independent electromagnetic hammer rapper assembly 10, an independent impact transfer pin assembly 14, and an independent guide member 16 for each spacing block 24, 36 or 40 incorporated within the heat exchanger assembly 20. It will be appreciated by those skilled in the art, however, that the foregoing description of a portion of the components of a typical heat exchanger assembly 20 and the drawing of a portion of its internal components in FIG. 1 has been intended only to provide a simplified illustration of how the electromagnetic hammer rapper 10 may be coupled to a typical heat exchanger assembly 20 to effect de-slagging of the heat tubing sections within such a heat exchanger assembly.

Referring now to FIG. 2, mounting assembly 12 can be seen in greater detail together with the impact transfer pin assembly 14 and phantom line 10 indicating the hammer rapper 10. The mounting assembly 12 includes a mounting flange 44 which is coupled via bolts 46 and 48 to a flanged portion 50 of the impact pin transfer assembly 14. The mounting flange 44 is also coupled to a front flanged portion 52 of hammer rapper 10.

The impact transfer pin assembly 14 includes an outer sleeve 54 which is affixed to flange portion 50, preferably by brazing, welding or other like methods of attachment. Similarly secured to the outer sleeve 54 is a second mounting flange 56 which enables the impact transfer pin assembly 14 to be secured to the guide member 16 shown in FIG. 1. From FIG. 2 the elongated impact transfer pin 22 can also be seen disposed concentrically within the outer sleeve 54 of the assembly 14, and concentrically with the hammer rapper assembly 10. The mounting assembly 12 and transfer assembly 14 thus enable kinetic energy imparted from the hammer rapper 10 to be transferred via impact transfer pin 22 to the spacing block 24 (shown in FIG. 1) to thereby vibrate the tubing sections 26 and effect a de-slagging of the tubing sections 26.

Referring now to FIGS. 3 and 4, a detailed cross-sectional view of the hammer rapper 10 is shown. Referring specifically to FIG. 3, the hammer rapper 10 generally comprises an outer housing 58 having a front end 52 and a rear end 60. Secured within the rear end 60 of the housing 58 via a lock ring 62 is a rear end pole 64 which also acts as a stop portion. Disposed concentrically within the front portion 52 of the housing 58 is a forward coil 66. Disposed within the rear portion 60 of the housing 58 is a retract coil 68. Disposed intermediate the forward and retract coils 66 and 68 is a center pole 69, which is electrically isolated by sections of insulating material 69a and 69b. Sections 69a and 69b may be comprised of any well known, conventional insulating materials which prevent electrical contact from occurring between the forward and retract coils and the center pole 69. A forward pole 71 is also included and electrically separated from the center pole 69 by electrical insulating material 71a, which is preferably identical to materials 69a and 69b. Insulating material 64a, which is also preferably identical to materials 69a and 69b, also electrically isolates the rear end pole 64 from the retract coil 68. The forward and retract coils 66 and 68 respectively further circumscribe a non-ferromagnetic sleeve 70 which extends almost the entire length of the housing 58. Disposed within the sleeve 70 is an elongated armature 72 having face and back portions 74 and 76 respectively, and front and rear portions 78 and 80 respectively. The armature 72 further includes an elongated, concentrically disposed bore 82 which acts as an air passageway, the function of which will be explained shortly, and also a non-ferromagnetic impact surface face plate 84 secured to the face portion 74 of the armature 72 via screws 86. The impact face plate 84 also contains an aperture 88 disposed concentrically with bore 82 so as not to obstruct airflow through the bore 82. Circumscribing a portion of the rear portion 80 of the armature 72 is a shading pole 90.

The armature 72 preferably comprises an iron plunger which is adapted to move slidably in a forward movement toward the impact transfer pin 22 and rearwardly towards the stop portion 64, as indicated by directional arrow 92. In a completely forward extended position, the surface of the impact surface face plate 84 will be in abutting contact with impact transfer pin 22. In the initial resting, or retracted, position the rear end 76 of the armature 72 will be in abutting contact with the stop portion 64. Accordingly, the illustration of FIG. 3 depicts the armature 72 at a midpoint within the housing 58 at which the armature 72 typically occupies during its outward, or impact, travel, or during its rearward or retract travel.

Referring specifically now to FIG. 4, a partial cross-sectional view of the impact transfer pin assembly 14 is shown together with a cross-sectional view of the hammer rapper 10 of the present invention. Assembly 14 further includes a spring 93 which circumscribes a portion of the impact transfer pin 22. The spring is interposed between an internal shoulder portion 95 of mounting flange assembly 12 and an annular, internal ring 97 which is secured to the transfer pin 22 by, for example, welding or brazing, to form an internal shoulder portion. The spring serves to exert biasing forces against shoulder portion 95 and annular ring 97 to thereby maintain the impact transfer pin 22 in constant, abutting contact with a portion of the spacing block 24.

Turning now to FIGS. 3 and 4, the operation of the hammer rapper 10 will be discussed. When an electrical current is applied to the forward coil 66, an electromagnetic field generated by coil 66 causes the armature 72 to be propelled outwardly towards and into abutting contact with impact transfer pin 22. The kinetic energy imparted to the transfer pin 22 by the armature 72 is transmitted through the transfer pin 22 to the spacing block 24. Spacing block 24 in turn transmits the kinetic energy to a portion of the heat tubing 26, which causes the tubing to vibrate, thereby freeing encrusted bits of slag and other like debris from the surface of the tubing 26. The outward or impact cycle of the armature thus acts to knock or "rap" the transfer pin 22 to thereby knock the bits of slag 94 from the tubing 26.

With further reference to FIGS. 3 and 4, the armature 72 is retracted by interrupting the flow of current to the forward coil 66 and enabling current flow to the retract coil 68. The retract coil generates an electromagnetic field which causes the armature 72 to be propelled rearwardly towards and into abutting contact with stop portion 64. The shading pole 90 serves to reduce the velocity at which the armature 72 is propelled to its retracted position, and also to eliminate any hum and buzz which may be generated by the retract coil 68.

Concentric bore 82, while not essential to satisfactory operation of the hammer rapper 10, is preferably included to eliminate any pumping or other pneumatic-like action which would otherwise occur when the armature 72 is propelled outwardly to impact the transfer pin 22. By including bore 82, the great majority of air contained within the hammer rapper 10 between the surface of the transfer pin 22 and the impact surface plate 84 will be allowed to escape through the armature 72 to thus provide an impact with transfer pin 22 having a maximum force.

Figure 5:
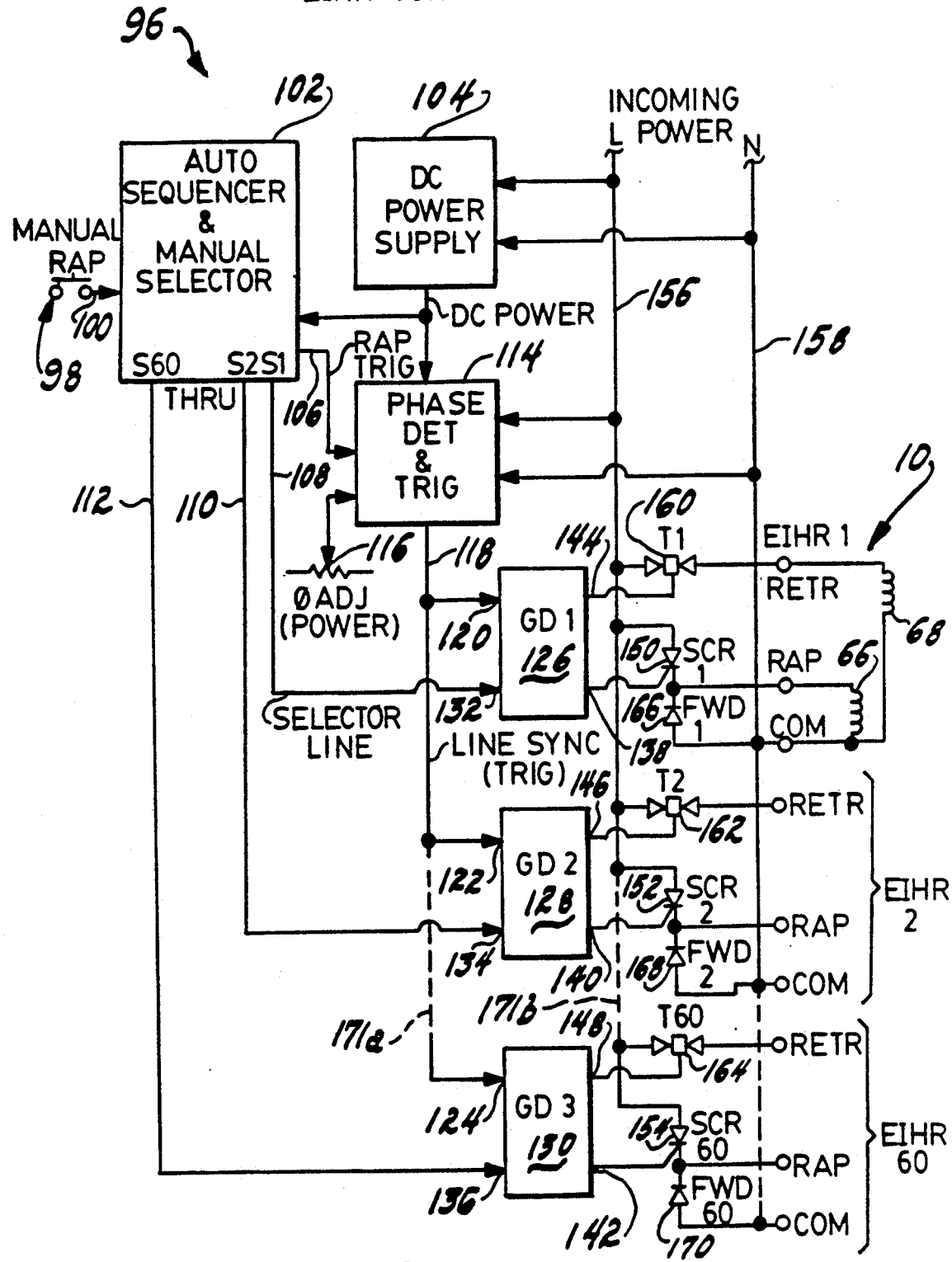
FIG. 5 is a simplified schematic diagram of an electromagnetic impact hammer rapper control system in accordance with the present invention.

Referring now to FIG. 5, there is shown an electromagnetic impact hammer rapper (EIHR) control system 96 in accordance with the hammer rapper system 11 for controlling the forward and rearward movements of a plurality of hammer rappers identical to hammer rapper 10. The control system 96 generally comprises a manually actuatable, normally open push button switch 98 which generates a rap command signal to be transmitted via line 100 to an auto sequencer and manual selector circuit (sequencer/selector circuit) 102. The sequencer/selector circuit 102 is preferably a programmable logic controller commercially available from a wide variety of manufacturers.

Circuit 102 receives power from a DC power supply 104 and generates a rap trigger signal on circuit line 106 and rap enable signals on circuit lines 108-112. A phase detection and trigger circuit 114 having a manually adjustable phase selection device 116 is also included for receiving the rap trigger signal on line 106 from sequencer/selector circuit 102 and generating a phase trigger signal on circuit line 118. The phase trigger signal 118 is further coupled to trigger inputs 120, 122 and 124 of gate drive logic circuits 126, 128 and 130 respectively. Logic circuits 126-130 further include selection inputs 132-136 which receive respectively rap enable signals on lines 108, 110 and 112 from sequencer/selector circuit 102.

With further reference to FIG. 5, the logic circuits 126-130 further include rap drive outputs 138, 140 and 142 respectively. Each logic circuit 126-130 also includes a retract drive output 144, 146, and 148 respectively.

Coupled to the rap drives 138-142 are the gates of independent silicon controlled rectifiers (SCR's) 150, 152 and 154. Each SCR 150-154 is further electrically coupled inbetween first power line 156 and the forward "rap" coil of its associated hammer rapper assembly. To avoid cluttering the FIG. 5, only the forward coil 66 of hammer rapper 10 has been shown. It should be understood, however, that the rap circuit lines of the second and third hammer rappers, i.e., EIHR 2 and EIHR 60, are each connected to forward coils in a fashion identical to that shown for hammer rapper 10.

Coupled to the retract drive outputs 144-148 of the logic circuits 126-130 are triacs 160, 162 and 164 respectively. The triacs 160-164 are further electrically connected between power line 156 and the retract coil of each hammer rapper assembly. Again, only coil 68 of hammer rapper assembly 10 has been shown although the retract lines of the remaining two hammer rapper assemblies EIHR 2 and EIHR 60 are configured identical to that of hammer rapper assembly 10. Diodes 166, 168 and 170 have also been included to enable current to circulate more freely through the coils 66 and 68 when they are de-energized. It should thus be understood that while only three gate drive circuits 144-148 have been illustrated in FIG. 5, a much larger plurality, typically up to 60 or more such circuits, as suggested by dashed lines 171a and 171b, are preferably employed in the present invention.

Turning now to the operation of the control system 96 of FIG. 5, the operation of the control system 96 will be described. When the manually actuatable rap switch is depressed by an operator of the system 96, a rap initiate signal is transmitted via signal line 100 to sequencer/selector circuit 102. Sequencer 102 operates to selectively generate a predetermined sequence of rap enable signals on lines 108-112, and generate a rap trigger signal on line 106. The rap enable signals 108, 110 and 112 are output to the enable inputs 132-136 of the logic circuits 126-130, and operate to enable circuits 126-130 in a predetermined sequence. The rap trigger signal 106 is output to the phase detection and trigger circuit 114, which triggers circuit 114 to provide a timing/trigger signal simultaneously to the trigger inputs 120-124 of logic circuits 126-130. The trigger signal (i.e., its duration or "phase") is adjustable via phase selection device 116, which in the preferred embodiment of the invention is a potentiometer. Accordingly, the duration for which a particular logic circuit 120-136 may be fully enabled, and thus the duration for which a particular SCR 150-154 may be enabled is user controllable.

When a particular logic circuit 126-130, for example logic circuit 126, receives both an enabling signal from sequencing circuit 102 and a timing/trigger signal from circuit 114, it selectively enables either the gate of triac 160 or the gate of SCR 150, to thereby selectively enable either the forward or retract coil 66 or 68 respectively. As mentioned previously herein, the force with which the armature 72 is propelled forward is determined by the phase adjustment of phase selection device 116. Accordingly, the impact and retraction phases of operation of the armature 72 may be electronically controlled, as well as the force with which the armature 72 impacts the impact transfer pin 22.

It should be appreciated that a number of components could be substituted for the circuits shown in FIG. 5. For example, sequencer/selector circuit 102 could alternatively comprise a dedicated microprocessor. Further, SCR's 15-154 could easily be replaced by a common, high voltage stepping relay. Still further, the hammer rapper of the present invention requires a relatively small amount of power to operate, thus saving energy costs. Those of ordinary skill in the art will appreciate that many other commercially available components could also be substituted for the remaining components of the system 96 to achieve the same objectives.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An electromagnetic hammer for knocking slag and other encrustations from heat tubes of a heat exchanger, comprising:
    an armature having impact and retract ends;
    independent forward coil means circumscribing said impact end of said armature for generating an electromagnetic field to propel said armature in a forward direction into contact with a force transfer member, whereby said force transfer member transfer said force to at least one heat tube of a heat exchanger;
    independent retract coil means circumscribing said retract end of said armature for generating an electromagnetic force operable to slidably retract said armature to a retracted position, said forward and retract coil means being independently energizable exclusive of each other to thereby enable said armature to be selectively intermittently propelled in said forward direction and retracted to said retracted position; and
    housing means circumscribing said forward and retract coil means for housing said forward and retract coil means and said armature.

2. The electromagnetic hammer of claim 1, further comprising a shaded pole circumscribing a portion of said retract end of said armature, said shaded pole operating to slow said armature down when said armature is retracted by said retract coil.

3. The electromagnetic hammer of claim 1, further comprising sleeve means interposed between said armature and said forward and retract coil means for enabling said armature to move in sliding fashion between impact and retracted positions.

4. The electromagnetic hammer of claim 1, further comprising a non-ferromagnetic plate secured to a portion of said impact end of said armature, said impact surface plate being operable to hammer said force transfer member when said forward coil means is electrically energized, thereby causing said force transfer member to knock said slag from said heat tube.

5. The electromagnetic hammer of claim 1, further comprising a rear pole secured within a rear portion of said housing, said rear pole being operable to provide a stop to limit slidable retraction of said armature when said armature is retracted in response to energization of said retract coil means.

6. The electromagnetic hammer of claim 1, wherein said armature further comprises a longitudinally disposed bore extending therethrough the length of said armature, said bore being operable to provide an air passageway to enable air confined within said sleeve and between said impact end of said armature and said force transfer member to be forcibly expelled through said armature.

7. An electromagnetic hammer rapper system for knocking loose slag and other encrustations from heat transfer tubes and walls of heat exchanger components, said system comprising:
    a housing having first and second ends;
    a stop pole disposed transverse to a portion of said second end of said housing and secured to said portion of said second end of said housing;
    an independent forward coil disposed within said first end of said housing;
    an independent retract coil disposed within said second end of said housing;
    a non-ferromagnetic sleeve lining an interior surface of said impact and retract coils;
    an elongated, ferromagnetic armature disposed within said sleeve, said armature being operable to move in an outwardly direction relative to said rear pole to forcibly impact an impact transfer pin in contact with said heat transfer tubes when said forward coil is electrically energized, said armature further being operable to move slidably in an inward direction relative to said rear pole along said sleeve and to abuttingly contact said rear pole when said forward coil is de-energized and said retract coil is energized, said forward and retract coils being independently energizable exclusive of each other to thereby enable said armature to be selectively intermittently propelled in said outward and inward directions; and means for controllably energizing said impact and said retract coils.

8. The system of claim 7, further comprising a shading pole circumscribing a portion of said rear portion of said armature for enabling the velocity of said armature to be controllably limited when said armature is caused to be retracted in response to electrical energization of said retract coil.

9. The system of claim 7, further comprising a non-ferromagnetic impact surface face plate secured to said face portion of said armature, said impact surface face plate being operable to impact said face of said impact transfer pin when said armature is caused to be accelerated towards said impact transfer pin in response to electrical energization of said forward coil.

10. The system of claim 7, wherein said means for controlling the energization of said impact and retract coils comprises:
a first, manually actuatable switch;
phase detection/triggering means responsive to said first switch for determining the duration that said forward coil is electrically energized, said phase detection/triggering means further having manually adjustable phase selection means for enabling said duration of energization of said forward coil to be controlled;
logic means responsive to said phase detection/triggering means for generating first and second control signals operable to control the energization of said forward and retract coils;
second switch means for controlling current flow to said impact coil to thereby control the energization of said impact coil; and
third switch means for controlling current flow to said retract coil to thereby control energization of said retract coil.

11. The system of claim 10, wherein said first switch comprises a normally open manual switch.

12. The system of claim 10, wherein said second switch means comprises a silicon controlled rectifier.

13. The system of claim 10, wherein said third switch means comprises a triac.

14. The system of claim 7, wherein said means for controllably energizing said forward and retract coils comprises:
a first, manually actuatable switch for generating a rap signal;
auto sequencer/manual selector means responsive to said rap signal for generating a plurality of rap enabling signals and a rap trigger signal;
phase detection/triggering means responsive to said rap trigger signal for determining the duration for which said forward coil is to be energized, said phase detection/triggering means further having manually adjustable phase selection means for enabling user control over the duration for which said forward coil is energized;
a plurality of independent logic means each responsive to said phase detection signal and said plurality of rap enabling signals, each said logic means being operable to provide first and second control signals operable to enable energization of said forward and retract coils;
independent second switch means, each said second switch means being associated with a particular said logic means and responsive to said first control signal of its associated logic means, each said second switch means being operable to enable current flow through said forward coil in accordance with said rap enable signals to thereby cause said armature of each said electromagnetic impact hammer rapper to be propelled towards their associated impact transfer pin in a predetermined sequence; and
a plurality of independent third switch means, each said third switch means being associated with a specific logic means and responsive to said second control signal from its associated logic means, said third switch means being operable to enable current flow to each said retract coil of each said electromagnetic impact hammer rapper to thereby cause each said armature of said hammer rapper to be propelled to a retracted position in a predetermined sequence.

15. The system of claim 14, wherein said first switch comprises a normally open manual switch;
wherein each said second switch means comprises a silicon controlled rectifier; and
wherein each said third switch means comprises a triac.

16. An electromagnetic hammer rapper system for knocking loose slag and other encrustations from heat transfer tubes and walls of heat exchanger components, said system comprising:
a housing having first and second ends;
a stop pole disposed transverse to a portion of said second end of said housing and secured to said portion of said second end of said housing;
a forward coil disposed within said first end of said housing;
a retract coil disposed within said second end of said housing;
a non-ferromagnetic sleeve lining an interior surface of said forward and retract coils;
an elongated, ferromagnetic armature disposed within said sleeve, said armature being operable to move in an outwardly direction relative to said stop pole to forcibly impact an impact transfer pin in contact with said heat transfer tubes when said forward coil is electrically energized, said armature further being operable to move slidably in an inward direction relative to said stop pole along said sleeve and to abuttingly contact said stop pole when said forward coil is de-energized and said retract coil is energized, said forward and retract coils being independently energizable exclusive of each other to thereby enable said armature to be selectively intermittently propelled in said outward and inward directions;
a first, manually actuatable switch;
phase detection/triggering means responsive to said first switch for determining the duration that said forward coil is electrically energized, said phase detection/triggering means further having manually adjustable phase selection means for enabling said duration energization of said forward coil to be controlled;
logic means responsive to said phase detection triggering means for generating first and second control signals operable to control the energization of said forward and retract coils;
second switch means for controlling current flow to said impact coil to thereby control the energization of said impact coil; and
third switch means for controlling current flow to said retract coil to thereby control energization of said retract coil.

* * * * *